United States Patent
Vadlamani et al.

(10) Patent No.: US 9,262,318 B1
(45) Date of Patent: Feb. 16, 2016

(54) SERIAL FLASH XIP WITH CACHING MECHANISM FOR FAST PROGRAM EXECUTION IN EMBEDDED SYSTEMS

(71) Applicant: Marvell International Ltd., Hamilton (BM)

(72) Inventors: Satya Vadlamani, Austin, TX (US); Sindhu Rajaram, Austin, TX (US); Yongjiang Wang, Austin, TX (US); Lin Chen, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/205,712

(22) Filed: Mar. 12, 2014

Related U.S. Application Data

(60) Provisional application No. 61/780,279, filed on Mar. 13, 2013.

(51) Int. Cl.
| | |
|---|---|
| *G06F 3/00* | (2006.01) |
| *G06F 13/28* | (2006.01) |
| *G06F 13/12* | (2006.01) |
| *G06F 13/00* | (2006.01) |
| *G06F 12/02* | (2006.01) |
| *G06F 3/06* | (2006.01) |
| *G06F 3/08* | (2006.01) |

(52) U.S. Cl.
CPC .............. *G06F 12/0246* (2013.01); *G06F 3/06* (2013.01); *G06F 3/0679* (2013.01); *G06F 3/08* (2013.01)

(58) Field of Classification Search
CPC ............. G06F 3/06; G06F 3/08; G06F 3/122; G06F 3/0679
USPC ...................... 710/62, 3, 9, 26, 104
See application file for complete search history.

(56) References Cited

U.S. PATENT DOCUMENTS

| | | | | |
|---|---|---|---|---|
| 5,210,849 | A  * | 5/1993  | Takahashi et al. | 711/144 |
| 6,507,898 | B1 * | 1/2003  | Gibson et al. | 711/168 |
| 6,912,612 | B2 * | 6/2005  | Kapur et al. | 710/309 |
| 8,924,661 | B1 * | 12/2014 | Shachar et al. | 711/158 |
| 2008/0147902 | A1 * | 6/2008 | Ishii et al. | 710/19 |

* cited by examiner

*Primary Examiner* — Idriss N Alrobaye
*Assistant Examiner* — Getente A Yimer

(57) ABSTRACT

A system including a processor, a memory controller, and a flash memory module. The processor is configured to generate a request to retrieve information corresponding to an address. The memory controller module includes a cache memory configured to store information, and a cache control logic module configured to determine whether the cache memory stores the information corresponding to the address, if the cache memory stores the information corresponding to the address, retrieve the information from the cache memory and provide the information to the processor, and if the cache memory does not store the information corresponding to the address, generate a flash memory read request based on the address. The flash memory module is configured to, in response to receiving the flash memory read request, provide the information corresponding to the address to the memory controller module.

14 Claims, 4 Drawing Sheets

SERIAL FLASH XIP WITH CACHING MECHANISM FOR FAST PROGRAM EXECUTION IN EMBEDDED SYSTEMS

CROSS-REFERENCE TO RELATED APPLICATIONS

This application claims the benefit of U.S. Provisional Application No. 61/780,279, filed on Mar. 13, 2013. The entire disclosure of the application referenced above is incorporated herein by reference.

FIELD

The present disclosure relates to cache memory, and more particularly, to a configurable cache for serial flash memory in an embedded processor system.

BACKGROUND

In embedded processor systems (e.g., an embedded microcontroller (MCU)-based system), a CPU may access (e.g., execute) code (e.g., executable commands) stored in nonvolatile and volatile memories including, but not limited to, embedded parallel flash memory, read only memory (ROM), and random access memory (RAM) such as static RAM (SRAM). Some memory types (e.g., ROM and/or SRAM) may be included in a system on a chip (SOC) with the microcontroller. Other memory types (e.g., flash memory) may be included on the SOC and/or may be external to the CPU. In some applications, the CPU may access serial flash memory external to the CPU via a serial interface (e.g., via a serial peripheral interface, or SPI).

SUMMARY

A system includes a processor configured to generate a request to retrieve information corresponding to an address. A memory controller module includes a cache memory configured to store information, and a cache control logic module configured to determine whether the cache memory stores the information corresponding to the address, if the cache memory stores the information corresponding to the address, retrieve the information from the cache memory and provide the information to the processor, and if the cache memory does not store the information corresponding to the address, generate a flash memory read request based on the address. A flash memory module is configured to, in response to receiving the flash memory read request, provide the information corresponding to the address to the memory controller module.

In other feature, the memory controller module includes a serial interface, and the cache control logic module is configured to provide the flash memory read request to the flash memory module via the serial interface. The memory controller module is configured to store configuration data, and the configuration data defines an operating characteristic of the cache memory. The processor and the memory controller module are located in a system on a chip.

A method includes, using a processor, generating a request to retrieve information corresponding to an address and, using a memory controller module, determining whether a cache memory stores the information corresponding to the address, if the cache memory stores the information corresponding to the address, retrieving the information from the cache memory and providing the information to the processor, and, if the cache memory does not store the information corresponding to the address, generating a flash memory read request based on the address. The method further includes, using a flash memory module, and in response to receiving the flash memory read request, providing the information corresponding to the address to the memory controller module.

In other features, the method further includes providing the flash memory read request to the flash memory module via a serial interface, storing configuration data that defines an operating characteristic of the cache memory, and providing the processor and the memory controller module in a system on a chip.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
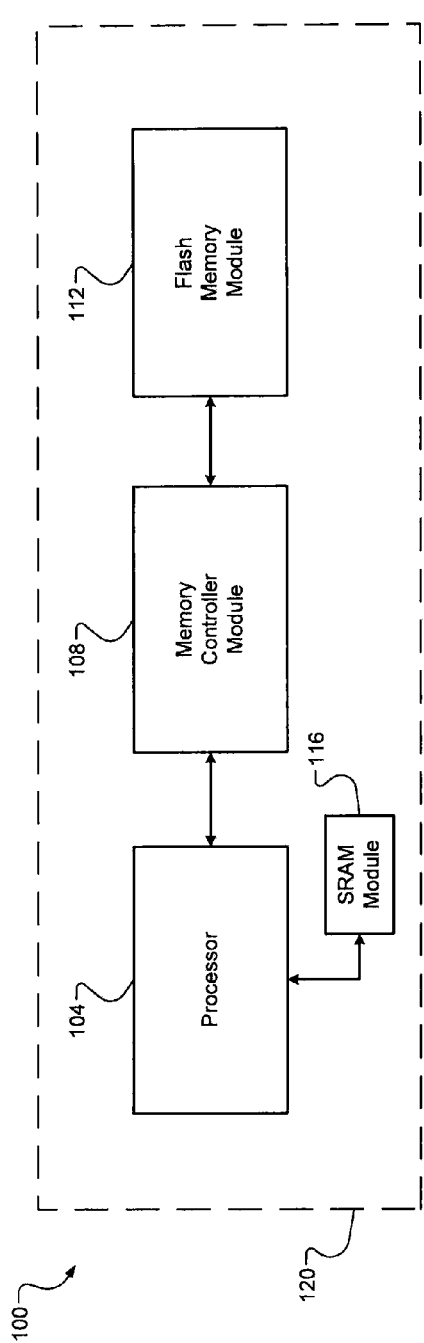
FIG. 1 is a functional block diagram of an example embedded system according to the principles of the present disclosure.

Increasing an amount of memory available to an embedded processor (such as in a microcontroller (MCU)-based embedded system) includes, for example, increasing a size of main memory (e.g., ROM and/or RAM) and/or providing memory, such as serial flash memory, external to the processor. Increasing the size of main memory may be limited due to a small size of the processor. Conversely, using an external memory increases a pin count of the processor and/or limits a number of pins available for other functions. For example, the processor may have only 4 pins available for communication to and from the processor. Accordingly, increasing the size of the local memory and/or providing an external memory may be undesirable and/or difficult to implement.

In implementations with external serial flash memory, the processor may communicate with an SRAM, and a memory controller transfers data such as executable code from the flash memory to the SRAM. The flash memory is not memory mapped within the processor (i.e., the flash memory is not included in an address space accessible by the processor). Accordingly, the processor operates on the code stored in the SRAM and is not configured to directly operate on the code stored in the external flash memory. Further, directly accessing the external flash memory (by the processor), using eXecute-In-Place (XiP) or another protocol, is relatively slow compared to accessing the SRAM. For example, accessing the external flash memory includes sending commands (e.g., 1-byte read commands) from the processor to the memory controller, and/or from the memory controller to the external flash memory, which increases processing overhead.

An embedded processor system according to the principles of the present disclosure includes a configurable cache memory located on the memory controller. For example only, the embedded processor system corresponds to a system on a chip (SOC) that includes the processor and the memory controller. A portion of the address space (e.g., the code space) of the processor is mapped to an external serial flash memory, and the configurable cache memory located on the memory controller is provided between the processor and the external serial flash memory. The processor is configured to access the portion of the address space mapped to the external serial flash memory. In other words, programs run/executed by the processor (including instructions and other read only data) are stored in the external serial flash memory and the memory controller provides a communication path with a configurable cache memory between the processor and the external serial flash memory. The serial flash memory may be located on the SOC with the CPU and the memory controller (while still being external to the processor and the memory controller) and/or may be located external to the SOC.

Accordingly, the processor is configured to directly access the external serial flash memory in the same manner as the main memory (e.g., the SRAM), and the configurable cache memory on the memory controller stores a portion of the code stored in the external serial flash memory. If a read request by the processor requests data from a portion of the address space corresponding to the external serial flash memory, the memory controller first determines whether the requested code is available in the configurable cache (i.e., the memory controller checks for a cache hit). A size of the configurable cache may be sufficient to ensure that most accesses to the external serial flash memory result in a cache hit. As such, most attempts to access the address space corresponding to the external serial flash memory (i.e., the attempts resulting in a cache hit) require a comparable amount of time as accesses to the main memory.

FIG. 1 shows an example embedded system 100. For example only, the system 100 is shown as an embedded MCU system 100, although other types of embedded processor systems may implement the principles of the present disclosure. The embedded MCU system 100 includes a processor 104, a memory controller module 108, a serial flash memory module 112, and a RAM (e.g., SRAM) module 116 located on an SOC 120. The serial flash memory module 112 is external to the processor 104 and the memory controller module 108. Although shown on the SOC 120, in some implementations the serial flash memory module 112 may be located external to the SOC 120.

Figure 2:
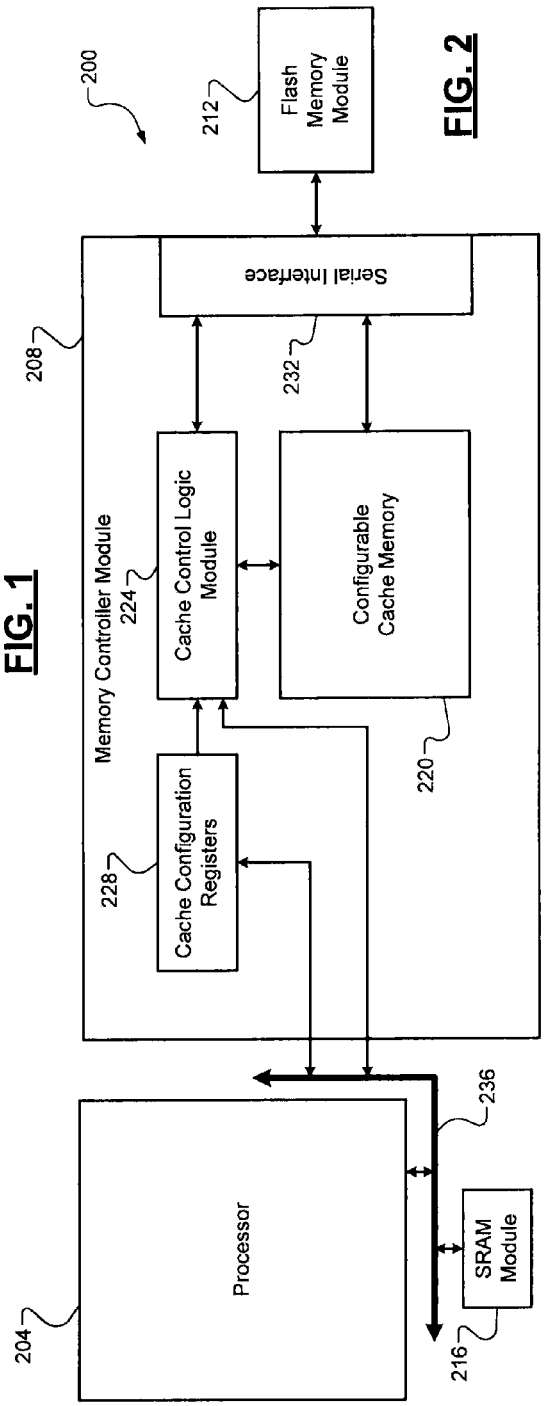
FIG. 2 is a functional block diagram of an example embedded system shown in more detail according to the principles of the present disclosure.
Figure 3:
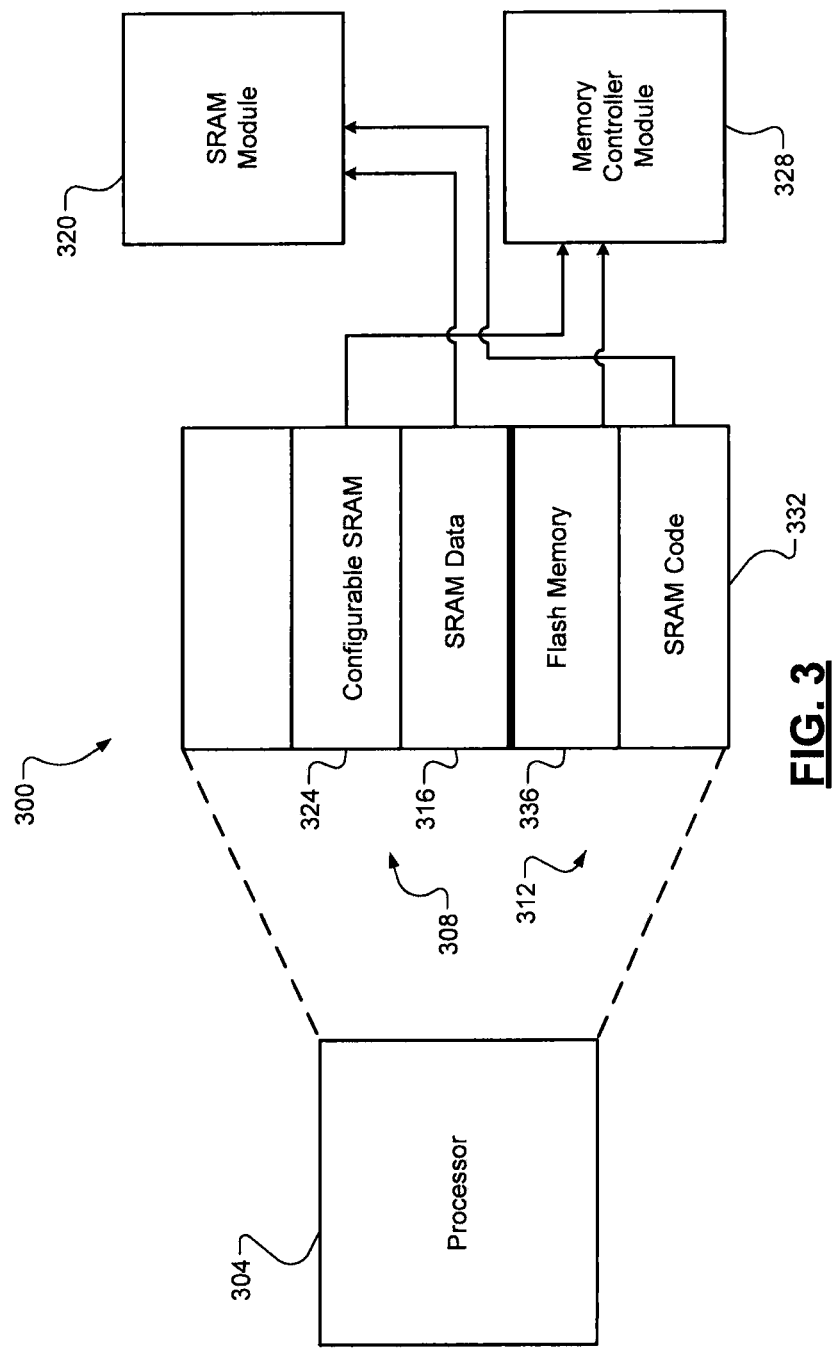
FIG. 3 illustrates an example address space accessible by a processor according to the principles of the present disclosure.

The memory controller module 108 includes a configurable cache memory (not shown; see FIGS. 2 and 3). A portion of the address space (e.g., the code space) of the processor 104 is mapped to the external serial flash memory module 112, and the configurable cache memory located on the memory controller module 108 is provided between the processor 104 and the external serial flash memory module 112. The processor 104 is configured to access the portion of the address space mapped to the external serial flash memory module 112. Accordingly, programs run/executed by the processor 104 (including instructions and other read only data) are stored in the external serial flash memory module 112 and the memory controller module 108 provides a communication path with a configurable cache memory between the processor 104 and the external serial flash memory module 112.

FIG. 2 shows an example embedded MCU system 200 including a processor 204, a memory controller module 208, a serial flash memory module 212, and an SRAM module 216 in more detail. The memory controller module 208 includes a configurable cache memory 220 a cache control logic module 224, cache configuration registers 228, and a serial interface 232 (e.g., an SPI). For example only, the cache memory 220 includes SRAM.

The processor 204 executes code and accesses data stored in the SRAM module 216. For example, the processor 204 accesses the SRAM module 216 according to an address space associated with the processor 204. The address space defines a range of addresses corresponding to physical addresses of the SRAM module 216. For example only, the address space includes a code space (e.g., to store code) and a data space (e.g., to store data). A portion of the address space further includes a range of addresses corresponding to the flash memory module 212. For example, portions of each of the code space and the data space may be allocated to the flash memory module 212. Accordingly, if the processor 204 generates a read request to access code and/or data stored in a physical address corresponding to a portion of the address space allocated to the flash memory module 212 (e.g., via bus 236), the read request is instead provided to the memory controller module 208.

The memory controller module 208 determines whether the code and/or data corresponding to the read request generated by the processor 204 is available in the configurable cache memory 220 (i.e., whether an address corresponding to the read request is a cache hit). For example, the cache control logic module 224 processes the read request to determine whether the requested code/data is stored in the cache memory 220. If the requested code/data is stored in the cache memory 220, the cache control logic module 224 retrieves the code/data from the cache memory 220 and provides the retrieved code/data to the processor 204 via the bus 236.

If the requested code/data is not stored in the cache memory 220 (i.e., there is a cache miss), then the cache control logic module 224 generates a request to retrieve the code/data from the flash memory module 212. For example, the cache control logic module 224 determines a flash address corresponding to the read request and generates a request to retrieve the code/data from the flash memory module 212 via the serial interface 232. Generating the request may include translating the physical address in the original read request received from the processor 204 into a serial flash memory address.

The configurable cache memory 220 is configured according to the cache configuration registers 228. The cache configuration registers 228 are programmed to define one or more configurable features of the cache memory 220. For example, a size of the cache memory 220 may be configured according to the cache configuration registers 228. More specifically, a first portion (e.g., a cache portion) of the SRAM corresponding to the cache memory 220 may be assigned to be used as cache while a second portion (e.g., a non-cache portion) of the SRAM may be assigned to be used as SRAM (e.g., to be available for direct access by the processor 204). Other features of the cache memory 220 that may be configurable using the cache configuration registers 228 include, but are not limited to, cache line size and a size of the data cache. These cache configuration registers 228 may be configured according to, for example only, configuration data stored in the SRAM module 216 and/or read-only memory. For example, the configuration data may be implemented by system initialization firmware.

FIG. 3 shows an example address space 300 accessible by a processor 304. The address space includes a data space 308 and a code space 312. The data space includes a first range of addresses 316 that correspond to physical addresses of an SRAM module 320 and a second range of addresses 324 that correspond to physical addresses to be translated by memory controller module 328. Similarly, the code space includes a third range of addresses 332 that correspond to physical addresses of the SRAM module 320 and a fourth range of addresses 336 that correspond physical addresses to be translated by the memory controller module 328. Accordingly, if the processor 304 generates a read request corresponding to the first range of addresses 316 or the third range of addresses 332, then code/data corresponding to the read request is retrieved from the SRAM module 320. Conversely, if the processor 304 generates a read request corresponding to the second range of addresses 324 or the fourth range of addresses 336, then the code data corresponding to the read request is retrieved by the memory controller module 328 (i.e., from either the configurable cache memory 220 or the flash memory module 212 as shown in FIG. 3). The second range of addresses 324 may correspond to, for example, a portion of the configurable cache memory 220 that is assigned to be used as additional SRAM by the processor 204 as described above.

Figure 4:
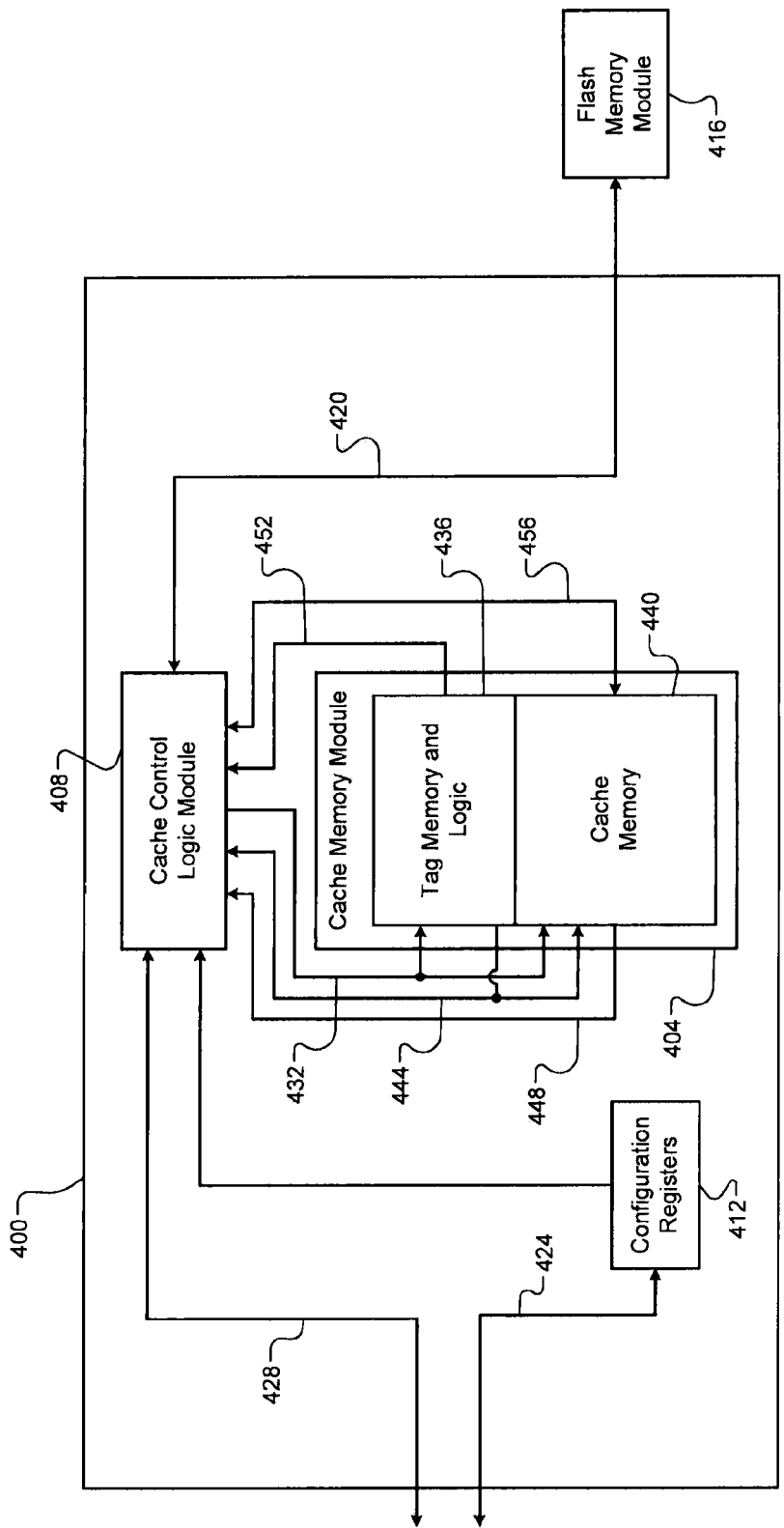
FIG. 4 is a functional block diagram of an example memory control module according to the principles of the present disclosure.

FIG. 4 shows an example memory controller module 400 in more detail. The memory controller module 400 includes a cache memory module 404, a cache control logic module 408, and cache configuration registers 412. The memory controller module 400 communicates with an external flash memory module 416 via a serial interface, such as a serial peripheral interface (SPI) 420. The memory controller module 400 communicates with a processor (e.g., the processor 204 as shown in FIG. 2) via, for example only, a system bus 424 and/or an advanced high-performance bus (AHB) 428.

The cache control logic module 408 may include logic configured to implement one or more state machines (e.g., finite state machines, or FSMs) to, for example only, process a read request received via the system bus 424, provide an address 432 corresponding to the read request to the cache memory module 404 (e.g., to tag memory and logic 436 and cache memory 440), process a cache hit/miss indication 444 generated by the tag memory and logic 436, process read data 448 received from the cache memory 440 in the event of a cache hit, process a flash address 452 corresponding to the read request in the event of a cache miss, generate a flash read request and provide the flash read request to the flash memory module 416 via the SPI 420 (e.g., according to SPI protocol), and/or provide data read from the flash memory module 416 to the cache memory 440.

Figure 5:
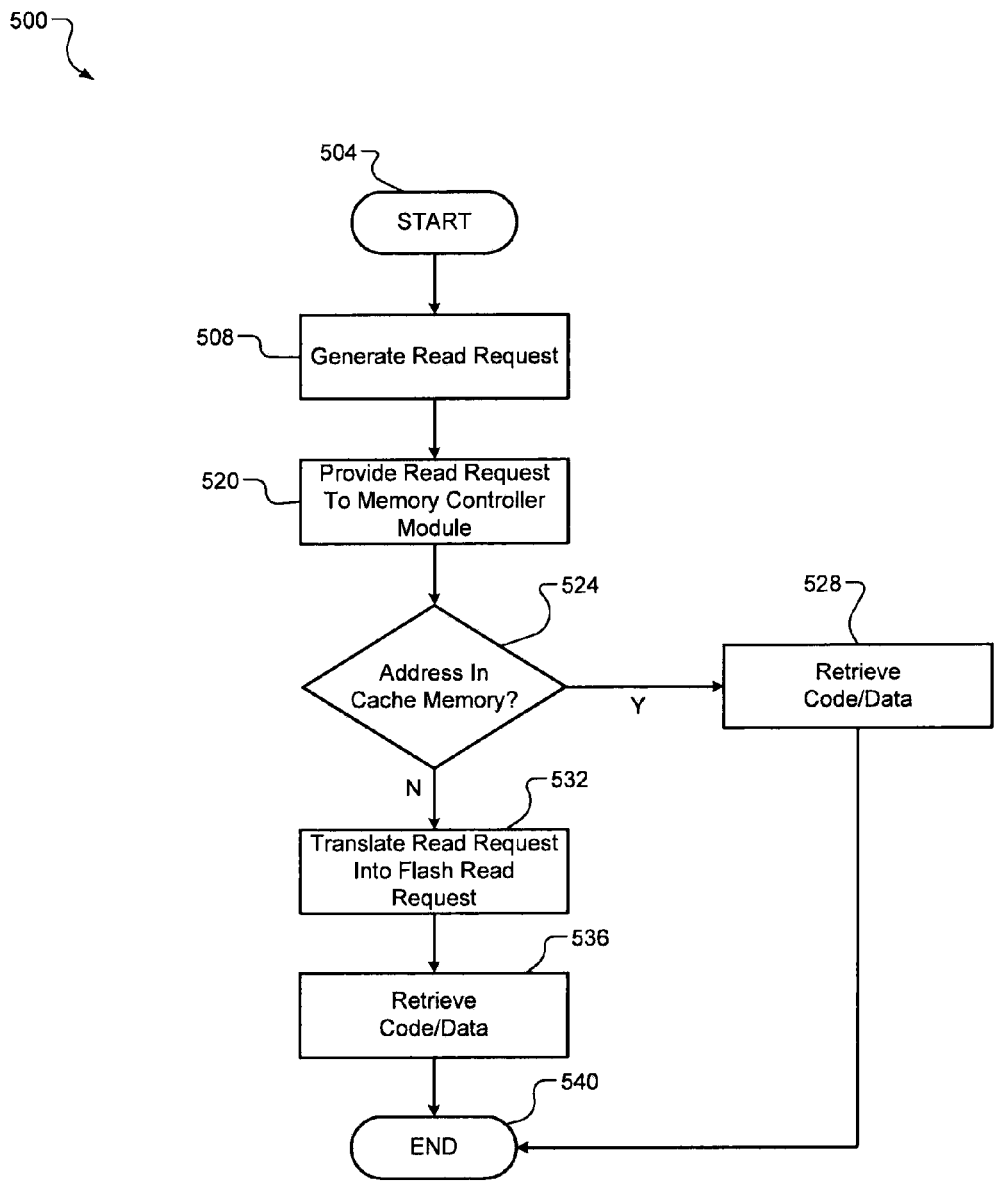
FIG. 5 is a flowchart illustrating an example serial flash memory access method according to the principles of the present disclosure.

FIG. 5 shows an example serial flash memory access method 500 starting at 504. At 508, the method 500 generates, using a processor, a read request having an associated physical address within an address space. At 520, the method 500 provides the read request to a memory controller module. The memory controller module includes a configurable cache memory and communicates with an external serial flash memory. At 524, the method 500 determines whether the physical address corresponds to an address of the configurable cache memory. If true, the method 500 continues to 528. If false, the method 500 continues to 532. At 528, the method 500 retrieves the code/data from the address of the configurable cache memory and provides the code/data to the processor.

At 532, the method 500 translates the read request into a serial flash memory read request having an associated flash address. At 536, the method 500 retrieves the code/data from the flash address of the external serial flash memory and provides the code/data to the processor. The method ends at 540.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

What is claimed is:

1. A system, comprising:
   a processor having an address space, wherein the address space includes (i) a first portion allocated to data and (ii) a second portion allocated to code, wherein the processor is configured to generate a request to retrieve information corresponding to an address in the address space;
   a memory controller module comprising
      a cache memory configured to store information, and a cache control logic module configured to (i) determine whether the cache memory stores the information corresponding to the address, (ii) if the cache memory stores the information corresponding to the address, retrieve the information from the cache memory and provide the information to the processor, and (iii) if the cache memory does not store the information corresponding to the address, generate a flash memory read request based on the address; and a flash memory module configured to, in response to receiving the flash memory read request, provide the information corresponding to the address to the memory controller module, wherein the second portion of the address space allocated to code includes a first range of addresses corresponding to a main memory and a second range of addresses corresponding to the flash memory module, wherein the first range of addresses and the second range of addresses are different and non-overlapping, and wherein the processor is configured to execute code stored in the flash memory module by accessing the second range of addresses.

2. The system of claim 1, wherein each of the main memory and the cache memory includes static random access memory.

3. The system of claim 1, wherein the memory controller module comprises a serial interface, and wherein the cache control logic module is configured to provide the flash memory read request to the flash memory module via the serial interface.

4. The system of claim 1, wherein the memory controller module is configured to store configuration data, wherein the configuration data defines an operating characteristic of the cache memory.

5. The system of claim 4, wherein the operating characteristic corresponds to partitioning the cache memory into a cache portion and a non-cache portion.

6. The system of claim 4, wherein the memory controller module includes a register configured to store the configuration data.

7. The system of claim 1, wherein the processor and the memory controller module are located in a system on a chip.

8. A method, comprising:
using a processor, generating a request to retrieve information corresponding to an address space of the processor, wherein the address space includes (i) a first portion allocated to data and (ii) a second portion allocated to code;

using a memory controller module,
determining whether a cache memory stores the information corresponding to the address,
if the cache memory stores the information corresponding to the address, retrieving the information from the cache memory and providing the information to the processor, and
if the cache memory does not store the information corresponding to the address, generating a flash memory read request based on the address; and using a flash memory module, in response to receiving the flash memory read request, providing the information corresponding to the address to the memory controller module wherein the second portion of the address space allocated to code includes a first range of addresses corresponding to a main memory and a second range of addresses corresponding to the flash memory module, and wherein the first range of addresses and the second range of addresses are different and non-overlapping, and further comprising, using the processor, executing code stored in the flash memory module by accessing the second range of addresses.

9. The method of claim 8, wherein each of the main memory and the cache memory includes static random access memory.

10. The method of claim 8, further comprising providing the flash memory read request to the flash memory module via a serial interface.

11. The method of claim 8, further comprising storing configuration data that defines an operating characteristic of the cache memory.

12. The method of claim 11, wherein the operating characteristic corresponds to partitioning the cache memory into a cache portion and a non-cache portion.

13. The method of claim 11, wherein storing the configuration data includes storing the configuration data in a register.

14. The method of claim 8, further comprising providing the processor and the memory controller module in a system on a chip.

* * * * *